J. BERG.
VEHICLE BUMPER SUPPORT.
APPLICATION FILED JUNE 11, 1917.
1,240,167.
Patented Sept. 18, 1917.
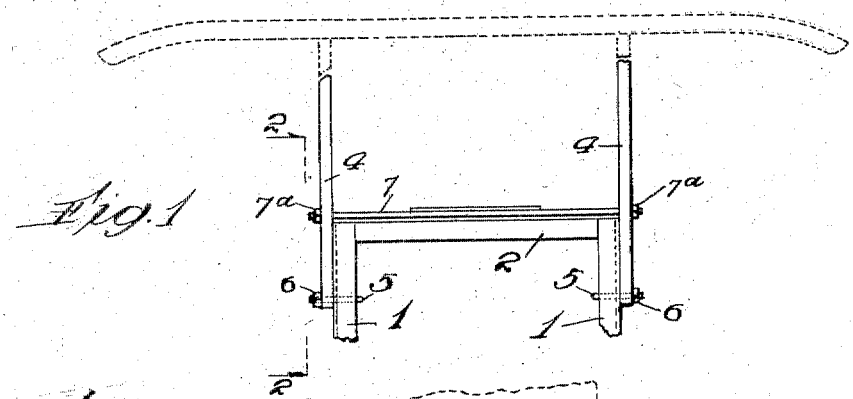
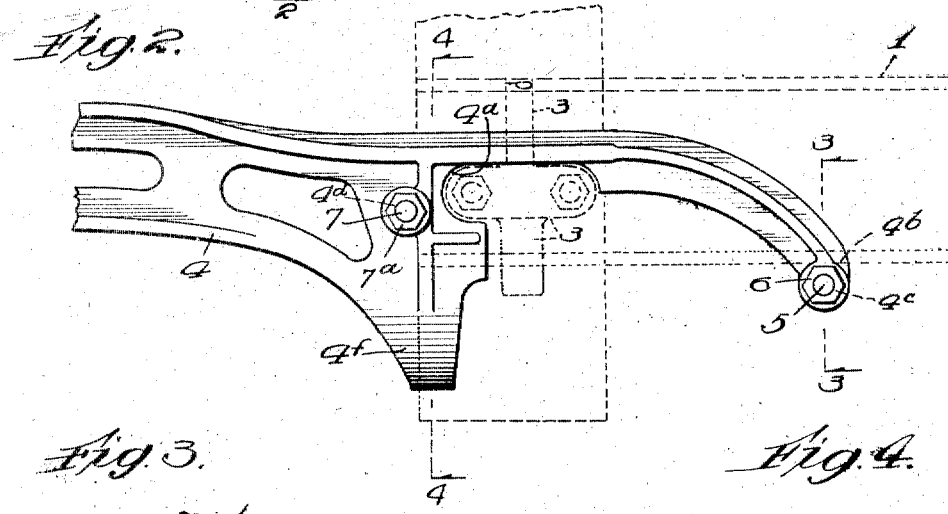
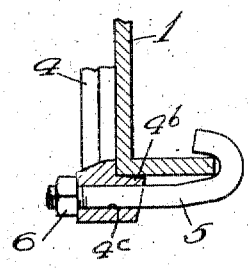
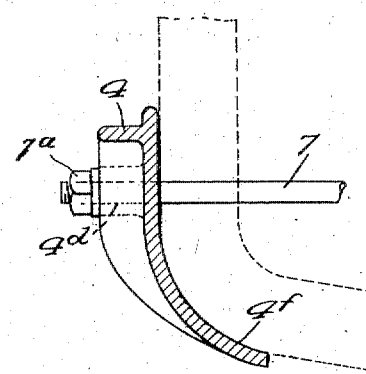
Inventor:
Joseph Berg,
by Burton & Burton
his attys
Witness:

UNITED STATES PATENT OFFICE.

JOSEPH BERG, OF CHICAGO, ILLINOIS, ASSIGNOR TO STEWART-WARNER SPEEDOMETER CORPORATION, OF CHICAGO, ILLINOIS, A CORPORATION OF VIRGINIA.

VEHICLE-BUMPER SUPPORT.

1,240,167.  Specification of Letters Patent.  Patented Sept. 18, 1917.

Application filed June 11, 1917. Serial No. 173,938.

*To all whom it may concern:*

Be it known that I, JOSEPH BERG, a citizen of the United States, residing at Chicago, in the county of Cook and State of Illinois, have invented new and useful Improvements in Vehicle-Bumper Supports, of which the following is a specification, reference being had to the accompanying drawings, forming a part thereof.

The purpose of this invention is to provide an improved form of supporting device for a vehicle bumper, particularly adapted to certain well known types of automobile. It consists in the elements and features of construction shown and described as indicated in the claims.

In the drawings:

Figure 1 is a plan view of a portion of an automobile frame, having the bumper supports which constitute this invention mounted upon it.

Fig. 2 is a side elevation.

Fig. 3 is a section at the line, 3—3, on Fig. 2.

Fig. 4 is a section at the line, 4—4, on Fig. 2.

In the drawings, 1, 1, represent the side bars of the frame of the automobile. 2 is the transverse bar at the end of which the bumper is to be applied. 3 represents a bracket rigidly mounted on the outer side of the side bar at the end of the transverse bar for the purpose of affording securement for certain other parts of the structure, and commonly referred to as the lamp bracket. 4, 4, are the bumper-supporting arms at the opposite sides of the vehicle, having the bumper parts secured to their forward ends, the bumper parts being shown in dotted lines, their particular construction not constituting any part of the present invention. Each of the bumper-supporting arms, 4, is recessed as shown at $4^a$, to accommodate the lamp bracket, 3, when the bumper-supporting arm is applied upon the outer side of the side bar, 1, the recess, $4^a$, being formed so that the bumper-supporting arm engages the bracket at the forward side,—that is, for the thrust which will be communicated from the bumper,—and at the upper side for taking the down weight of the bumper and supporting arm. The bumper-supporting arm extends from the lamp bracket along the side bar, 1, for a distance of several inches and is provided at the end with a projection, $4^b$, which engages under the lower edge of the side bar. Below the upper shoulder of this projection, $4^b$, the arm is provided with a bolt aperture, $4^c$, through which the threaded end of a hook bolt, 5, extends, the bolt extending under the lower edge of the side bar, 1, and its hook end engaging with the inner edge of said side bar, so that the nut, 6, applied upon the outer threaded end of the bolt may clamp the arm, 4, against the side bar. The foregoing description applies equally to the two arms, 4, at the opposite sides of the frame. These two arms are connected by a tie rod, 7, which extends across the frame in front of the transverse bar, 2, thereof, passing through apertures, $4^d$, in the brackets, 4, and having its ends threaded and provided with nuts, $7^a$, which are tightened to clamp both the brackets simultaneously against the outer sides of the side bars, 1, to which they are respectively applied, the clamping stress being opposed to the clamping stress of the hook bolts, 5. The wide base afforded by the distance between the tie rods and the hook bolts serves to render the securement of the bumper-supporting arms to the vehicle frame side bars very firm. For the purpose of further bracing the arms against any distortion, they are each provided with a projection, $4^f$, which extends under a projection, $4^f$, of the frame, and thus, in addition to preventing the distortion, they serve to check any upward movement of the forward ends of the arms and of the bumper carried thereby.

I claim:—

1. In combination with a vehicle frame having a side bar, and a bracket rigid with the side bar at the outer side thereof; a bumper-supporting arm applied against the outer side of the side bar, and recessed to accommodate and engage the bracket; a hook which engages the inner end of the arm beyond the bracket with the side bar, extending under the latter for such engagement; a rod engaging the arm at the opposite end of the bracket from said hook and extending across the frame; means with which the rod engages at the opposite side of the frame from said side bar, and means on the rod for clamping the arm against the side bar.

2. In combination with the frame of an automobile having a side bar, and a bracket rigid with the side bar at the outer side thereof; a bumper-supporting arm applied against the outer side of the side bar and recessed to accommodate the bracket and engage above it; a hook which engages the inner end of the arm beyond the bracket with a side bar, extending under the latter for such engagement; a rod engaging the arm at the opposite side of the bracket from said hook and extending across the frame; means with which the rod engages at the opposite side of the frame from said side bar, and means on the rod for clamping the arm against the side bar, the frame having a transverse bar and the bumper supporting arm having a projection which engages under said transverse bar.

3. In combination with the frame of an automobile having side bars and a transverse bar connecting them, and brackets rigid with the side bars at the outer sides thereof, bumper-supporting arms applied against the outer sides of the side bars respectively, and recessed to accommodate and engage the brackets; hook bolts engaged with the inner ends of said bumper-supporting arms, having their hook ends engaged with the side bars and extending under the latter for such engagement; nuts on the bolts outside the bumper-supporting arms for tightening said engagement; a tie rod extending across the frame in front of the transverse bar and engaging the bumper-supporting arms, and means for tightening said tie rods to clamp the bumper-supporting arms against the outer sides of the side bars.

In testimony whereof I have hereunto set my hand at Chicago, Illinois, this 7 day of June, 1917.

JOSEPH BERG.

DISCLAIMER.

1,240,167.—*Joseph Berg*, Chicago, Ill. VEHICLE-BUMPER SUPPORT. Patent dated September 18, 1917. Disclaimer filed June 6, 1920, by the assignee, *Stewart-Warner Speedometer Corporation*.

Enters this disclaimer—

To the whole of the claims in said specification.

[*Official Gazette June 22, 1920.*]